Patented May 8, 1945

2,375,477

UNITED STATES PATENT OFFICE 2,375,477

MOTION-PICTURE PHOTOGRAPHY

Alan Hynd, New York, N. Y.

No Drawing. Application May 8, 1944,
Serial No. 534,693

2 Claims. (Cl. 88—16)

This invention relates to motion picture photography.

A typical motion picture film consists of a succession of "takes" or scenes. A take or scene consists of anything that appears within the range of a motion picture camera while the camera is in operation. A scene is not necessarily restricted to one set but may very well take in considerable territory if, for example, the camera is moved from one position to another (such as from one room to another, from indoors to outdoors, or from one outdoor location to another) between the time that the camera begins operating and the time that it stops operating. The camera may be caused continuously to follow the progress of a character or a group of characters through several rooms in a series of sets representing the interior of a home. In fact, motion picture producers for some years past have been obtaining a variety of backgrounds in single takes or scenes by placing the camera on a truck and moving the camera while it is in operation, this procedure being technically known as a "dolly" shot. By utilizing the dolly-shot procedure, it is a comparatively simple matter to follow a character from one room into a second room and perhaps into a third room. However, difficulty is experienced in having the camera continuously follow a character through a large number of rooms in a house, then to a point outside of the house and then back into the house and again through several rooms. The ordinary procedure has been to photograph such a sequence in a succession of takes with the operation of the camera being interrupted between successive takes. When the film is projected it is very apparent that the operation of the camera was interrupted between takes.

An object of this invention is a procedure of motion picture photography that results in a motion picture which, regardless of its length, appears to be in one continuous take or scene. The invention may be used for an entire picture or for any scene or scenes or group or groups of scenes.

A motion picture photographed according to the present invention produces the illusion of continuous and uninterrupted camera operation. Actually however, the motion picture comprises a succession of takes which are photograhed under such conditions that when the takes are assembled the motion picture so far as the method is utilized appears to be the result of continuous camera operation. The camera is operated to photograph a series of takes or scenes in the usual manner and may be kept at a single location throughout the take or may be moved about according to the dolly-shot procedure. Actually, the camera is stopped during what appears to be continuous camera operation and subsequently the photographic process is resumed at the exact and precise point at which it was stopped. The illusion of continuous and uninterrupted camera operation is accomplished through the medium of a panoramic photographic process which involves moving the camera sidewise or up and down or both at specific intervals during the shooting of the script so that the camera no longer photographs living actors or anything else that is animate. The camera is caused to cease its panoramic movement when it is focused on an inanimate object such as a portrait, a hat, a doll, a baby carriage, etc., after which a series of pictures of the inanimate object are taken whereupon the camera is stopped.

When the next scene or take is ready to be photographed, the camera is again focused on the same inanimate object in the same relationship as before and another series of pictures are taken of the inanimate object duplicating precisely the last series of pictures of the previous take. The camera is then utilized for panoramic purposes again so that it will move in such a way as to again focus on living actors or other animate objects who will thereupon resume the continuity of the camera story at the approximate but by no means precise point at which they were photographed in the preceding scene or take. The ultimate film may be an assembly of several series of action pictures with a transition series of actionless pictures between successive series of action pictures. A series of actionless pictures between successive series of action pictures serves to produce the illusion of continuous camera operation.

The process of ending a take on an inanimate object, and beginning the next take at the precise point where the preceding take ended, enables the producer of a film to exactly and precisely match the last frame of the preceding scene with the first frame of the subsequent scene so that after all the scenes are put together the film, when projected on a screen, presents the illusion of having been made in whole or in part of a continuous take or scene. The benefits to be derived from this invention are manifold. A variety of backgrounds without interruption will increase the interest in and enhance the entertainment value of a specific motion picture or specific motion pictures. Preferably, the inanimate objects incorporated in the illusion will be of dramatic or comic or other interest in themselves since they may be integral parts of the narrative, documents or other subject being photographed. The procedure of interrupting the operation of the camera while it is focused on an inanimate object will enable the producer of the film to photograph any specific scene as many times as is necessary to achieve a desired result since each scene begins with the photographing of an inanimate object. It will be possible to move the camera for whatever reason from the point where it has last been operated and replace it again in the exact spot where it has been for purposes of resuming the photographic process since it is possible to duplicate precisely conditions surrounding the photographing of an inanimate object although it is highly difficult or practically impossible to duplicate the conditions surrounding the photographing of actors or other animate objects.

I claim:

1. The method of producing the illusion of continuous operation of a motion picture camera in taking a series of independent sets of action pictures with actual interruption of camera operation between said sets, said method comprising taking a series of pictures of an inanimate object prior to interruption of camera operation after taking a series of action pictures and upon resumption of camera operation after interruption taking a further set of pictures of said inanimate object followed by another set of action pictures without interruption of camera operation.

2. The method of producing the illusion of continuous operation of a motion picture camera in taking a series of independent sets of action pictures with actual interruption of camera operation between said sets, said method comprising continuously operating a camera to take a series of action pictures followed by a series of pictures of a stationary object, interrupting the camera operation and subsequently continuously operating the camera to take a further set of pictures of said stationary object followed by another set of action pictures.

ALAN HYND.